(12) United States Patent
Murali et al.

(10) Patent No.: US 12,192,400 B2
(45) Date of Patent: Jan. 7, 2025

(54) RELATIONSHIP GRAPHS FOR TELECOMMUNICATION NETWORK FRAUD DETECTION

(71) Applicant: AT&T Intellectual Property I, L.P., Atlanta, GA (US)

(72) Inventors: Surya Murali, San Jose, CA (US); Edmond J. Abrahamian, Richmond Heights, MO (US); Ana Armenta, San Jose, CA (US); Prince Paulraj, Coppell, TX (US); Elijah Hall, Plano, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 399 days.

(21) Appl. No.: 17/566,905

(22) Filed: Dec. 31, 2021

(65) Prior Publication Data

US 2023/0216967 A1 Jul. 6, 2023

(51) Int. Cl.
*H04M 15/00* (2024.01)
*G06N 20/00* (2019.01)
(Continued)

(52) U.S. Cl.
CPC .......... *H04M 15/47* (2013.01); *G06N 20/00* (2019.01); *H04M 3/2218* (2013.01); *H04M 3/2281* (2013.01); *H04W 8/26* (2013.01)

(58) Field of Classification Search
CPC .. H04M 15/47; H04M 3/2218; H04M 3/2281; H04M 15/00; H04M 15/41;
(Continued)

(56) References Cited

U.S. PATENT DOCUMENTS

2015/0127628 A1* 5/2015 Rathod .............. G06Q 30/0251
707/710
2019/0377819 A1* 12/2019 Filliben ................. G06N 3/084
(Continued)

OTHER PUBLICATIONS

Goyal, P., et al., "Graph Embedding Techniques, Applications, and Performance: A Survey", Knowledge Based Systems, Dec. 27, 2017, 18 pages, arXiv: 1705.02801v4.
(Continued)

*Primary Examiner* — Hirdepal Singh

(57) ABSTRACT

A processing system may maintain a relationship graph that includes nodes and edges representing phone numbers and device identifiers having associations with the phone numbers. The processing system may obtain an identification of a first phone number or a first device identifier for a fraud evaluation and extract features from the relationship graph associated with at least one of the first phone number or the first device identifier. The plurality of features may include one or more device identifiers associated with the first phone number, or one or more phone numbers associated with the first device identifier. The processing system may then apply the features to a prediction model that is implemented by the processing system and that is configured to output a fraud risk value of the first phone number or the first device identifier and implement at least one remedial action in response to the fraud risk value.

20 Claims, 4 Drawing Sheets

(51) Int. Cl.
*H04M 3/22* (2006.01)
*H04W 8/26* (2009.01)

(58) Field of Classification Search
CPC ....... H04M 15/57; G06N 20/00; G06N 5/022; H04W 8/26; H04W 4/24; H04L 12/14
USPC ........................................................ 455/411
See application file for complete search history.

(56) References Cited

U.S. PATENT DOCUMENTS

| | | | |
|---|---|---|---|
| 2022/0070292 A1* | 3/2022 | Casal | G06F 18/214 |
| 2022/0114183 A1* | 4/2022 | Paul | G06F 16/24575 |
| 2022/0172211 A1* | 6/2022 | Muthuswamy | G06F 16/9024 |
| 2023/0209351 A1* | 6/2023 | Djankovic | H04W 12/48 |
| | | | 455/411 |
| 2024/0187517 A1* | 6/2024 | Joshi | H04M 3/38 |

OTHER PUBLICATIONS

Kung-Hsiang., H., "A Gentle Introduction to Graph Neural Networks (Basics, DeepWalk, and GraphSage)." Towards Data Science, Feb. 10, 2019, accessed from https://towardsdatascience.com/a-gentle-introduction-to graph-neural-network-basics-deepwalk-and-graphsage-db5d540050b3, 10 pages.

Hamilton, W., et al., "Inductive Representation Learning on Large Graphs", $31^{st}$ Conference on Neural Information Processing Systems, (NIPS 2017), 19 pages.

"Graph Embedding", Chapter 4, accessed on Nov. 22, 2021 from https://cse.msu.edu/~mayaod/dlg_book/chapters/chapter4.pdf, 32 pages.

* cited by examiner

RELATIONSHIP GRAPHS FOR TELECOMMUNICATION NETWORK FRAUD DETECTION

The present disclosure relates generally to telecommunication network operations, and more particularly to methods, computer-readable media, and apparatuses for applying a plurality of features extracted from a relationship graph representing a plurality of phone numbers and a plurality of device identifiers to a prediction model that is configured to output a fraud risk value of a first phone number or a first device identifier.

BACKGROUND

Machine learning in computer science is the scientific study and process of creating algorithms based on data that perform a task without any specific instructions. These algorithms are called models and different types of models can be created based on the type of data that the model takes as input and also based on the type of task (e.g., prediction, classification, or clustering) that the model is trying to accomplish. The general approach to machine learning involves using the training data to create the model, testing the model using the cross-validation and testing data, and then deploying the model to be used by real-world applications.

SUMMARY

In one example, the present disclosure describes a method, computer-readable medium, and apparatus for applying a plurality of features extracted from a relationship graph representing a plurality of phone numbers and a plurality of device identifiers to a prediction model that is configured to output a fraud risk value of a first phone number or a first device identifier. For instance, in one example, a processing system including at least one processor may maintain a relationship graph that includes nodes and edges, the relationship graph representing a plurality of phone numbers and a plurality of device identifiers having associations with the plurality of phone numbers. The processing system may obtain an identification of a first phone number of the plurality of phone numbers or a first device identifier of the plurality of device identifiers for a fraud evaluation and extract a plurality of features from the relationship graph, the plurality of features associated with at least one of the first phone number or the first device identifier. The plurality of features may include one or more device identifiers of the plurality of device identifiers associated with the first phone number, or one or more phone numbers of the plurality of phone numbers associated with the first device identifier. The processing system may then apply the plurality of features to a prediction model that is implemented by the processing system and that is configured to output a fraud risk value of the first phone number or the first device identifier and implement at least one remedial action in response to the fraud risk value.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
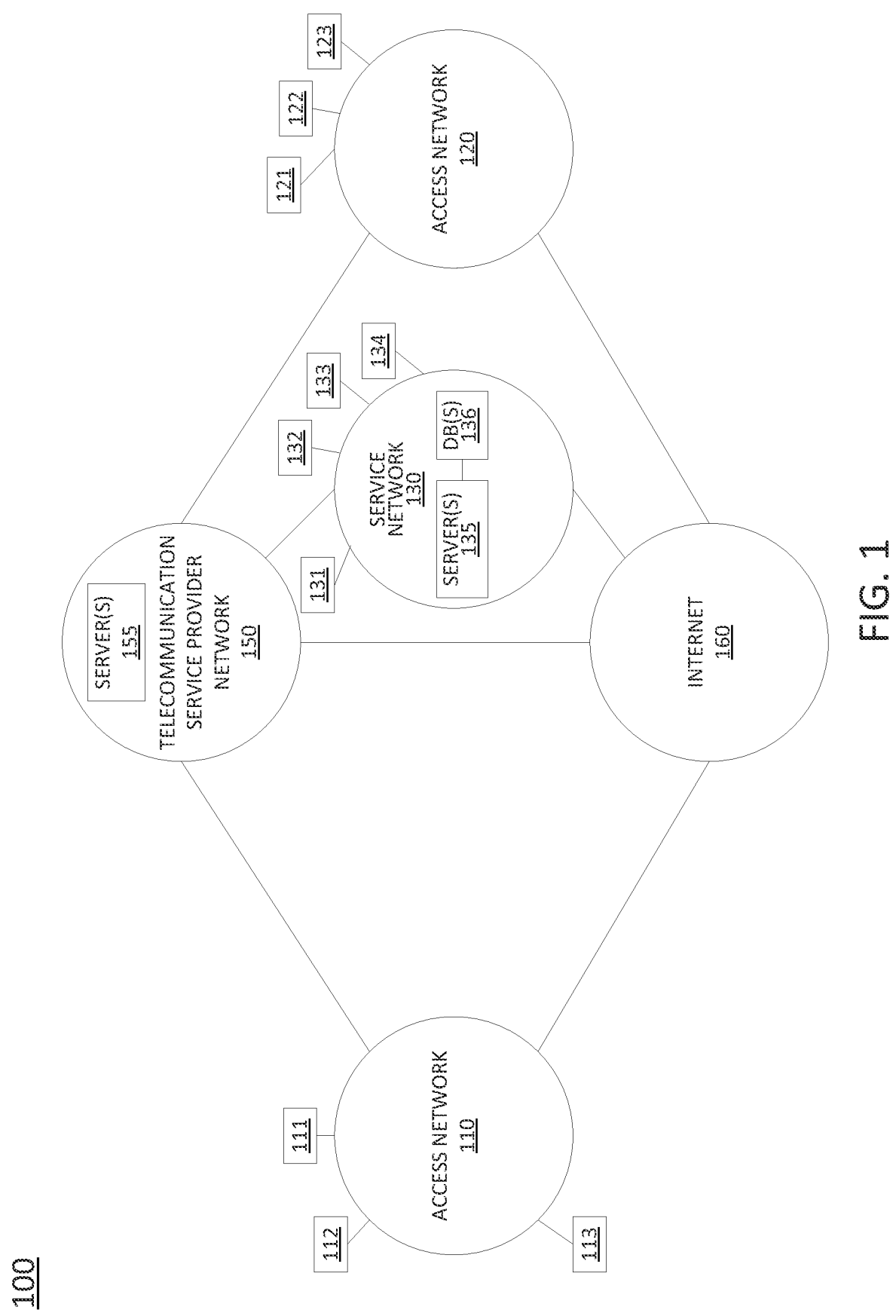
FIG. 1 illustrates one example of a system related to the present disclosure.

The present disclosure broadly discloses methods, non-transitory (i.e., tangible or physical) computer-readable storage media, and apparatuses for applying a plurality of features extracted from a relationship graph representing a plurality of phone numbers and a plurality of device identifiers to a prediction model that is configured to output a fraud risk value of a first phone number or a first device identifier. To illustrate, in a common scam called "subscription fraud," a fraudster may try to obtain a mobile device on an installment plan with a telecommunication network service provider (or "carrier"), while having no intention of paying off the device. Instead, the device is resold, and the telecommunication network service provider may have to write-off the value of the device when the deception is discovered. The same person may repeat this scam again and again, with either the person's own identity or a stolen identity, or may collaborate with a ring of fraudsters. In one example, a fraudster may obtain one or more devices, wait a certain number of days to circumvent the carrier's anti-fraud rules, and then apply for more devices. In an effort to avoid suspicion, fraudsters fake call, text, and data usage on their accounts, even though the original devices have already been resold. To do this, a fraudster may swap out a subscriber identity module (SIM) card between a new device and a burner phone (a cheap, discardable phone). The SIM card and phone number appear to be in active use, even though the burner phone, with a unique device identifier (e.g., an international mobile equipment identity (IMEI)) different from the new device's unique identifier, is the device being used to make calls and texts, not the new (already resold) device. These burner phones are often shared across one fraudster's multiple fake accounts or among an entire fraud ring's multiple fake accounts. In addition, if a device has been used for fraud in the past, there is a good chance that a new SIM card used on the old device might still be used for fraud activities. Examples of the present disclosure analyze these devices and their connections with fraud activities, in order to detect and prevent further fraud.

In particular, in one example the present disclosure provides an anti-fraud platform that utilizes a relationship graph (e.g., a network graph or graph database) that associates phone numbers (e.g., SIM card identifiers (such as international mobile subscriber identities (IMSIs) and/or phone numbers contained therein)) and device identifiers (e.g., International Mobile Equipment Identities (IMEIs)). An IMEI is unique and different for every device. An IMSI is a 15-digit number stored on the SIM card to identify a user on a cellular network. A phone number, or customer telephone number (CTN) is the actual telephone number currently assigned to the device and may be included in the 15-digits of the IMSI.

When endpoint devices (e.g., cellular telephones, other wireless communication devices, Voice over Internet Protocol (VoIP) devices, or other devices assigned phone numbers) make or receive calls or texts, or transmit or receive data (e.g., e.g., according to a mobile data usage plan) via the telecommunication network, the phone number (also referred to herein as a customer telephone number (CTN)), IMSI, and IMEI may be logged. The logs/data records may broadly be referred to as call detail records (CDRs). In one example, the present disclosure transforms these logs into a network graph, or network graph database (also referred to herein as a "relationship graph" or "relationship graph database"). In one example, a first subset of nodes/vertices in the relationship graph may represent phone numbers (e.g., recorded as the phone numbers or other values representative thereof, such as IMSIs, which may contain the phone numbers). A second subset of nodes/vertices may represent devices identifiers (e.g., IMEIs). Edges/links in the relationship between the nodes may represent associations/relationships between phone numbers and device identifiers. In one example, additional edges may represent relationships between phone numbers, e.g., those having a "trusted" relationship. In one example, additional nodes may represent billing accounts (or billing account numbers (BANs)), and additional edges may be included to represent relationships between phone numbers and billing accounts. In one example, additional edges may similarly represent relationships between device identifiers and billing accounts. It should be noted that these relationships are not just for current account settings, but may be maintained over historical time periods, such as 30 days, 60 days, 90 days, or even a year or more. In this manner, information regarding phone numbers or device identifiers being associated with multiple accounts may be captured in the relationship graph.

Systems for telecommunication network fraud and threat detection may utilize call detail records (CDRs) and similar data sets. Responsible personnel may perform various feature engineering procedures and pre-analysis for respective prediction models, rule-based threat detection, and so forth. This kind of repeated use can incur large processing costs in terms of time as well as compute resources. For instance, simple joins to evaluate multiple hop connections can be time consuming and expensive. In addition, there may be many versions of rolling aggregated tables for these types of features, adding to the time and complexity of feature processing. In contrast, examples of the present disclosure utilize a unique relationship graph structure that captures connections between phone number and device identifiers (and in some examples, further include relationships between two phone numbers, between phone number and/or device identifiers and billing accounts, and others).

An anti-fraud platform of the present disclosure may utilize the relationship graph and extract features as prediction model inputs that might otherwise be cost prohibitive (e.g., with regard to time, compute resources, and/or monetary costs). In addition, wider patterns that are traditionally harder to describe may be identified with greater ease and speed as compared to prior approaches, such as using table-based data sets. Advantageously, detection of fraud-associated phone numbers or device identifiers in real-time or near-real time may provide numerous benefits to customers and a network operator such as blocking devices and accounts associated with fraud or other threat activities to the network, thereby preventing additional customers from being affected and freeing network resources for other beneficial and non-malicious uses, preventing a fraudulent online and/or in-person retail transaction from being completed (such as a fraudster being stopped from obtaining a new phone), and so forth.

To illustrate, given a single device identified by its IMSI, one feature that may be extracted from the relationship graph may comprise a number of devices that have used the same SIM card as the original device on the telecommunication network. Another feature may comprise the identities of such other device(s) (e.g., the IMEI or IMEIs of such other device(s)). Still another feature may comprise information regarding whether such other IMEI(s) are associated with multiple phone numbers, and so forth. In one example, when an existing customer applies for a new mobile device or tries to complete a sales transaction, the request may be sent via a sales front-end system to an anti-fraud platform. In one example, the anti-fraud platform may initially query a database of existing customers to obtain a list of current CTNs/IMSIs and/or IMEIs associated with the customer. The anti-fraud platform may then pass this list to the relationship graph. Features associated with the phone number(s) or device identifier(s) of the list may be extracted from the relationship graph. The features may be applied as inputs to a fraud detection/prediction model which may be configured to output a fraud score, or fraud probability, such as a machine learning model (MLM), regression model, or the like. In one example, the prediction model may take other inputs as well, such as additional information regarding a customer from other records of the telecommunication network (e.g., billing address information, which may be substantially different from an area code of a phone number currently or previously associated with the account, and so forth), third party information (such as creditworthiness, a cardholder name for a credit card used for paying account charges, etc.), and so forth. The fraud score may be passed back to the anti-fraud platform, which may be used to make a decision about whether to let a customer proceed with an application or transaction. For instance, the anti-fraud platform may alert order fulfillment services when a suspected fraud-associated phone number or device identifier aligns with significant account events, such as an upgrade or an account change (e.g., changing or adding an authorized user), or may generate reports for network personnel to identify fraud rings and the members thereof, (e.g., linked phone numbers and/or device identifiers). The anti-fraud platform may also be invoked for sales of new or added mobile phone lines in an existing or newly established account and/or where a port-in number is specified (e.g., in the case where the customer is porting a number from another carrier). In addition, the anti-fraud platform may flag certain port-in numbers for disallowing such port-ins or monitoring such port-ins, or may specify elevated risks for such port-in numbers, and so forth.

In one example, the present disclosure may apply a graph embedding process to generate one or more vectors (e.g., "embeddings"), representing one or more portions/aspects of the relationship graph, and may further set labels for a given use case to make predictions (e.g., using one or more prediction models, such as machine learning models (MLMs), regression models, or the like). For instance, in the case of fraud prediction and/or scoring, the present disclosure may utilize a set of known events (e.g., known fraudulent transactions, and more specifically known phone numbers and/or device identifiers associated with such known fraudulent transactions) to train a prediction model. In one example, embeddings or other features of the relationship graph may be associated with known events/labels and used as training and/or testing input data for one or more prediction models for a fraud prediction and/or scoring task.

In one example, the present disclosure may also generate sequences of behaviors that lead to fraud events. These sequences can be extracted for prediction models to be trained and learn fraud behaviors. An example is a sequence of relatively random activities so as to make a phone number appear to be in use by a legitimate user (while actually being controlled by a fraudster who is preparing to use the number for fraudulent activities). For instance, it has been observed that extremely low or excessively high usage occurs on known fraud-related phone numbers compared to non-fraud-related phone numbers for a period of time prior to an occurrence of a fraud event (e.g., 30-90 days, two weeks, etc.). In one example, metrics such as the number of calls in/out, minutes of talk time in/out, and the number of text messages in/out, or the like are stored as node and/or edge information in a relationship graph, and may be used as features for evaluation, e.g., classification/prediction of threat activity regarding a particular communication and/or a particular phone number. In one example, a relationship graph may be constructed to additionally represent communications between a fraud-related phone number and other phone numbers that have happened over a certain period of time. A hot-list of phone numbers in the graph may then serve as a "warning signal" when a customer walks into a retail store of the telecommunication network seeking account upgrades, a new phone or other endpoint devices, a change to the authorized user of an account or an addition of another authorized user, etc.

The present disclosure thus extends a telecommunication network's fraud detection capabilities. A user may seem like a good customer based on other attributes, but the user may have actually swapped-out a SIM card of a current device and placed the SIM card in a device already used for fraud. Analyzing the device and its connection with fraud activities can help solve this problem. If a device has been used for fraud in the past, there is a good chance that a new SIM card used on the old device is being used for fraud activities. A relationship graph may be constructed and maintained using the telecommunication network's own call, text, and data logs (broadly, CDRs) which record when SIM cards/IMSIs/phone numbers and device identifiers were used together. The graph enables the identification of fraudsters because they use the same device (identified by IMEI or the like) in combination with multiple SIM cards. Interrogating the network graph with an IMEI and/or phone number (e.g., IMSI or other SIM identifier) may reveal if a customer's SIM card/phone number is connected to other SIM cards/phone numbers used for fraud, or to device identifiers of devices know to be used for fraud or otherwise known to be associated with fraud. This information may be extracted from the graph and applied as one or more inputs to a prediction model to obtain a fraud score, which may be used to implement at least one remedial action. These and other aspects of the present disclosure are discussed in greater detail below in connection with the examples of FIGS. 1-4.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or system, such as computing system 400 depicted in FIG. 4, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices (e.g., subscriber/customer devices) and/or one or more servers of one or more third parties, such as a credit bureau, a payment processing service (e.g., a credit card company), an email service provider, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth.

In the example of FIG. 1, service network 130 may include one or more servers 135 which may each comprise all or a portion of a computing device or processing system, such as computing system 400, and/or a hardware processor element 402 as described in connection with FIG. 4 below, specifically configured to perform various steps, functions, and/or operations for applying a plurality of features extracted from a relationship graph representing a plurality of phone numbers and a plurality of device identifiers to a prediction model that is configured to output a fraud risk value of a first phone number or a first device identifier, as described herein. For example, one of the server(s) 135, or a plurality of servers 135 collectively, may perform operations in connection with the example relationship graphs of FIG. 2 and/or the example method 300 of FIG. 3, or as otherwise described herein. In one example, the one or more of the servers 135 may comprise an artificial intelligence (AI)/machine learning (ML)-based service platform (e.g., a network-based and/or cloud-based service hosted on the hardware of servers 135).

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for applying a plurality of features extracted from a relationship graph representing a plurality of phone numbers and a plurality of device identifiers to a prediction model that is configured to output a fraud risk value of a first phone number or a first device identifier, as described herein. As just one example, DB(s) 136 may be configured to receive and store network operational data collected from the telecommunication service provider network 150, such as call logs, message detail records (e.g., regarding SMS or MMS messages), control plane signaling and/or session management messages, and so forth (broadly "call detail records" (CDRs)), mobile device location data, traffic volume records, error reports, network impairment records, performance logs, alarm data, and other information and statistics, which may then be compiled and processed, e.g., normalized, transformed, tagged, etc., and forwarded to DB(s) 136, via one or more of the servers 135. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In one example, DB(s) 136 may be configured to receive and store records from customer, user, and/or subscriber interactions, e.g., with customer facing automated systems and/or personnel of a telecommunication network service provider (e.g., the operator of telecommunication service provider network 150). For instance, DB(s) 136 may maintain call logs and information relating to customer communications which may be handled by customer agents via one or more of the devices 131-134. For instance, the communications may comprise voice calls, online chats, text messages, emails, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent.

Similarly, any one or more of devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In this regard, any one or more of devices 111-113 or 121-123 may comprise a device deployed at a retail location that may service live/in-person customers and that may generate and forward customer interaction records to DB(s) 136. For instance, such a device (e.g., a "personnel device") may comprise a tablet computer in which a retail sales associate may input information regarding a customer and details of the transaction, such as identity and contact information provided by the customer (e.g., a name, phone number, email address, mailing address, etc.), desired items (e.g., physical items, such as smart phones, phone cases, routers, tablet computers, laptop computers, etc., or service items, such as a new subscription or a subscription renewal, a type of subscription (e.g., prepaid, non-prepaid, etc.), an agreement duration (e.g., a one-year contract, a two-year contract, etc.), add-on services (such as additional data allowances, international calling plans, and so forth), discounts to be applied (such as free phone upgrades and/or subsidized phone upgrades, special group discounts, etc.), and so on. In such case, information entered and/or obtained via such personnel devices may be forwarded to server(s) 135 and/or DB(s) 136 for processing and/or storage. As such, DB(s) 136, and/or server(s) 135 in conjunction with DB(s) 136, may comprise a retail inventory management knowledge base. In addition, DB(s) 136 and/or server(s) 135 in conjunction with DB(s) 136 may comprise an account management system. For instance, information regarding subscribers' online and in-store activities may also be included in subscriber account records (e.g., in addition to contact information, payment information, information on current subscriptions, authorized users, duration of contract, etc.).

In one example, DB(s) 136 may alternatively or additionally receive and store data from one or more third parties. For example, one or more of the endpoint devices 111-113 and/or 121-123 may represent a server, or servers, of a consumer credit entity (e.g., a credit bureau, a credit card company, etc.), a merchant, or the like. In such an example, DB(s) 136 may obtain one or more data sets/data feeds comprising information such as: consumer credit scores, credit reports, purchasing information and/or credit card payment information, credit card usage location information, and so forth. In one example, one or more of endpoint devices 111-113 and/or 121-123 may represent a server, or servers, of an email service provider, from which DB(s) 136 may obtain email address service information (e.g., high-level information, such as the date that the email address was created and/or an age or approximate age of the email address since it was created, a mailing address and/or phone number (if any) that is associated with the email address (and if the third party is permitted to provide such information in accordance with the email address owner's permissions). Such information may then be leveraged in connection with email addresses that may be provided by customers during in-person transactions at telecommunication network service provider retail locations. Similarly, one or more of the endpoint devices 111-113 and/or 121-123 may represent a server, or servers, of one or more merchants or other entities (such as entities providing ticketed sporting events and/or concerts, email mailing lists, etc.), from which DB(s) 136 may obtain additional email address information (e.g., email address utilization information).

In one example, DB(s) 136 may store a relationship graph (or relationship graph database) in which nodes/vertices represent phone numbers and device identifiers and edges between the nodes represent associations/relationships between respective phone number-device identifier pairs. For instance, each time a CDR indicates a device identifier being used in connection with a phone number, an edge may be added to the relationship graph (if one does not already exist) between a node representing the phone number and a node representing the device identifier. In one example, additional edges may represent relationships between phone numbers, e.g., those having a "trusted" relationship. In one example, additional nodes may represent billing accounts (or billing account numbers (BANs)), and additional edges may be included to represent relationships between phone numbers and billing accounts. In one example, additional edges may similarly represent relationships between device identifiers and billing accounts. It should again be noted that these relationships are not just for current account settings, but may be maintained over historical time periods, such as 30 days, 60 days, 90 days, or even a year or more. In this way, information regarding phone numbers or device identifiers being associated with multiple accounts may be captured in the relationship graph.

Each node may also include additional information regarding a phone number or device identifier, such as an account number, the date that an account was opened and/or an age of the account, an account holder name, an account mailing address, and so forth. Alternatively, or in addition, the relationship graph may comprise a sub-graph of a k-partite/multi-partite graph in which at least one additional sub-graph may relate to account information (e.g., an "identity graph"). For instance, the relationship graph may incorporate data from subscriber account records such as described above, e.g., as additional nodes representing billing accounts/subscriber accounts and additional edges representing relationships/associations between phone numbers and/or device identifiers and billing accounts.

In one example, DB(s) 136 may store various prediction models (e.g., AI/ML-based prediction models) for various tasks. For instance, one or more prediction models may be trained to determine/predict whether a telephone number or device identifier is associated with fraud/fraud activity (or not). For example, a first prediction model may be trained and configured to accept telephone numbers as inputs, while a second prediction model may be trained and configured to accept device identifiers as inputs. However, in another example, a prediction model may be trained and configured to accept either type as an input (or both—for instance, if a user attempt to port-in a number and bring the user's own device, both the phone number and device identifier may be used as complementary inputs that may be applied to the fraud prediction model).

It should be noted that as referred to herein, a prediction model may include a machine learning model (MLM) (or machine learning-based model), e.g., a machine learning algorithm (MLA) that has been "trained" or configured in accordance with input data (e.g., training data) to perform a particular service, e.g., to detect/predict whether a phone number or device identifier is or is not associated with fraud/fraud activity, to classify a risk/threat level of being associated with fraud (e.g., high, medium, low risk), etc., to provide a fraud indicator, or value indicative of a likelihood of fraud, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, a fraud prediction, or other MLMs of the present disclosure may be in accordance with a MLA/MLM from an open source library, such as OpenCV, which may be further enhanced with domain specific training data. In an illustrative example, a fraud prediction MLM of the present disclosure may comprise a gradient boosted machine (GBM).

In one example, DB(s) 136 may also store training data and/or testing data that may be used to train and verify the accuracy of a prediction model for fraud detection and/or fraud scoring/classification, and so forth (broadly, a "fraud prediction model") as described herein. For instance, server(s) 135 may apply a graph embedding process (e.g., graph2vec, or the like) to the relationship graph to extract one or more vectors, or "embeddings," which may represent the graph overall or at least a portion of the relationship graph (e.g., a sub-graph relating to a given node associated with a particular phone number and two or three hops away from the phone number, four hops away from the phone number, etc.). Various vectors/embeddings may then be used as training data for training a fraud prediction model.

It should be noted that in one example, a prediction model may take an embedding/vector as input(s). In one example, the prediction model may also take the graph itself, a sub-graph thereof, or one or more features extracted directly from the graph or derived from the graph, as an additional input or inputs. In such case, a "set of input factors" may include an embedding/vector and the graph (or sub-graph), or other features extracted/derived therefrom. In addition, labels may be added to at least a portion of a plurality of sets of input factors (e.g., labels of "fraud" or "no fraud") as stored in DB(s) 136. In one example, the graph embedding process is learned/trained as part of the prediction model (e.g., where the extracted graph features and/or dimensionality of the vector(s)/embedding(s) are optimized for the specific task of the prediction model) or are trained as a separate process from the prediction model (e.g., guided graph embedding, where dimensionality of vector(s) and/or other hyperparameters is/are provided). Alternatively, dimensionality may be based upon selected loss criteria (e.g., an allowable level/percentage of loss of information).

Operations of server(s) 135 for applying a plurality of features extracted from a relationship graph representing a plurality of phone numbers and a plurality of device identifiers to a prediction model that is configured to output a fraud risk value of a first phone number or a first device identifier, and/or server(s) 135 in conjunction with one or more other devices or systems (such as DB(s) 136), are further described below in connection with the examples of FIGS. 2 and 3. In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth.

In addition, it should be understood that other aspects of the system 100 may be omitted from illustration in FIG. 1. As just one example, the system 100 may include a data distribution platform such as Apache Kafka, or the like, for obtaining sets/streams of data from telecommunication network service provider data source(s) (e.g., server(s) 155, devices 131-134, or the like) and third party data source(s) (e.g., endpoint devices 111-113, endpoint devices 121-123, or the like). The system 100 may also incorporate in-stream processing, such as preprocessing of raw data for ingestion into a graph/graph database (e.g., a relationship graph) stored by DB(s) 136 and/or for input into a prediction model via server(s) 135. For example, the server(s) 135 and/or DB(s) 136, as well as upstream data sources, may be deployed on one or more instances of Apache Flink, or the like, as part of and/or in association with the Kafka streaming platform. In addition, the prediction model(s), the graph embedding processes, and so forth may be trained within and/or may operate on such a platform. For instance, the server(s) 135 and/or DB(s) 136 may comprise an instance of Apache Spark, e.g., on top of Hive and Hadoop Distributed File System (HDFS), or similar arrangement. Thus, these and other aspects are all contemplated within the scope of the present disclosure.

Figure 2:
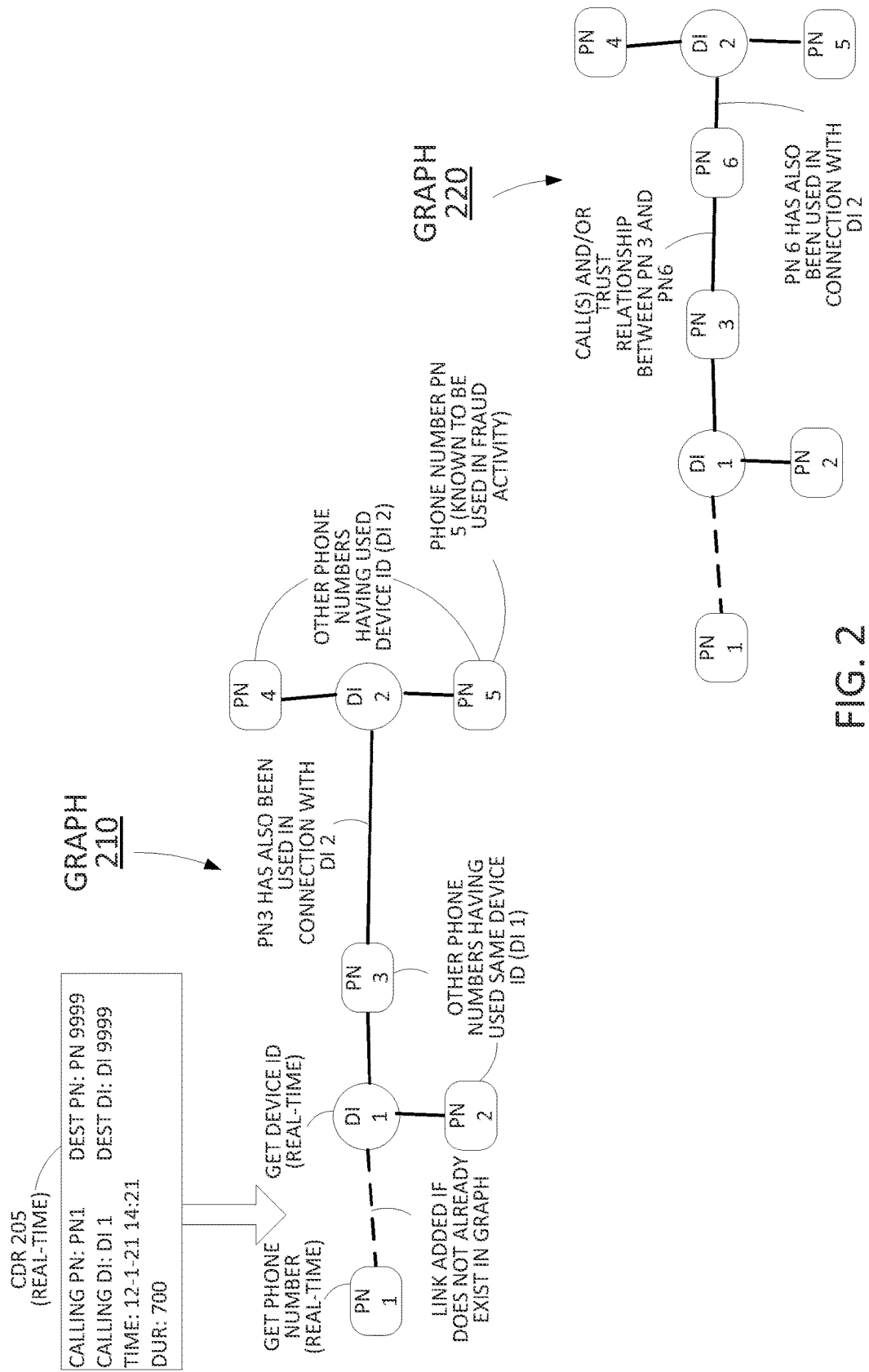
FIG. 2 illustrates example relationship graphs, in accordance with the present disclosure.

FIG. 2 illustrates example graphs 210 and 220 (e.g., relationship graphs), in accordance with the present disclosure. In one example, the construction and maintenance of the graphs 210 and/or 220, and the storage of the graphs 210 and/or 220 may be implemented via a processing system comprising one or more physical devices and/or components thereof, such as a server or a plurality of servers, a database system, and so forth. For instance, various aspects of the example(s) of FIG. 2 may be provided via components as illustrated FIG. 1, such as server(s) 135 and/or DB(s) 136, or the like.

As can be seen in graph 210, some nodes/vertices represent phone numbers (PN 1 through PN 4), while other nodes/vertices represent device identifiers (IDs) (DI 1 and DI 2). The links/edges between nodes represent relationships between the phone numbers and device identifiers. In one example, graph 210 may comprise a reduction of a k-partite pseudograph (G(V,E), where V is the set of all vertices/nodes and E is the set of all edges) to a weighted simple monopartite graph G'(V', E'), where the vertices V' is a subset of V and E' is a subset of the edge E. In one example, each edge may be represented as (u, v, m, n, o, p, r, s, . . . ), where (m, n, o, p, r, s . . . ) are features that are used to additionally define the relationship between u and v. For instance, for an edge between phone number (PN) 2 and device identifier (device ID or (DI)) 1, additional features labeling the edge may include a last time at which a relationship between PN 2 and DI 1 was recorded (e.g., as indicated by one or more CDRs, or the like), a number of calls involving both PN 2 and DI 1 (as caller and callee), a number of messages (e.g., SMS/text messages) involving both PN 2 and DI 1 (as sender and recipient), and so forth.

In an illustrative example, a call detail record (CDR) 205 may be obtained that includes various details of a call such as a calling phone number (PN 1), calling device identifier (DI 1), destination phone number (PN 9999), destination device identifier (DI 9999), time of the call, and duration (dur) of the call. Notably, the CDR 205 indicates a relationship/association between PN 1 and DI 1. Specifically, the call is being made by the device uniquely identified by DI 1 and is utilizing phone number PN 1. For instance, a SIM card encoded with an IMSI containing PN 1 may be installed in a mobile phone or the like which has the device identifier DI 1. In one example, the graph 210 may be checked to see if the relationship between PN 1 and DI 1 is already represented by an edge in the graph 210. If not, a link/edge may be added to the graph 210 to represent this as a new relationship.

As can be further seen in graph 210, DI 1 has existing or prior relationships with phone numbers PN 2 and PN 3. For instance, different SIM cards having IMSIs containing PN 2 and PN 3, respectively, may have been used in the device having device identifier DI 1 in the past for placing or receiving calls, sending or receiving text messages, and/or accessing data services from the telecommunication network, e.g., within the last 90 days, within the last six months, within the last year, within the last two years, etc. The graph 210 also includes an edge between the node representing PN 3 and a node representing another device identifier, DI 2. For instance, a SIM card encoded with an IMSI containing PN 3, or otherwise indicative of PN 3, may also have been used in a device having device identifier DI 2 at some time in the past (or currently). In addition, other phone numbers PN 4 and PN 5 may also have prior associations with DI 2 (or a current association therewith). For illustrative purposes, in the example(s) of FIG. 2, phone number PN 5 may have a known involvement in a fraud activity, which may be recorded as node data of the node of PN 5.

In another example, phone number PN1 may be a number that a customer is attempting to port-in for obtaining a new subscription with the telecommunication network. In addition, in one example, the customer may be attempting to bring an existing device into the service (e.g., a device having device identifier DI 1). In such case, an anti-fraud platform of the present disclosure may extract features from graph 210 using PN 1 and/or DI 1 as inputs. For instance, in one example, the features may be extracted using a graph embedding process. The features so extracted may be referred to as a "feature vector." Alternatively, or in addition, features may be extracted from graph 210 in another manner, such as graph traversal for a defined number of hops from the node representing PN 1 and/or the node representing DI 1. Notably, these features may include information pertaining to PN 5, as well as the label of PN 5 as being "fraud associated," i.e., known to be associated with fraud. In addition, as described above, these features may comprise one or more inputs to a fraud prediction model which may then output a fraud prediction (e.g., fraud/not fraud, or a value indicating a likelihood of fraud, such as on a scale of 1 to 100, etc.).

To illustrate, the graph 210 is similar to language knowledge graphs in that each phone number and/or device identifier is analogous to a word, and the order, frequency, and count of unique nodes in a subgraph are important information that is captured in the embedding space. Thus, in one example, each phone number or device identifier may be treated as a word. In addition, examples of the present disclosure may use graph2vec or other embedding techniques to generate unique embeddings/vectors. In one example, the embeddings/vectors may also be merged with the features on the weighted graph (e.g., graph 210) as complementary inputs to a fraud detection model. To further illustrate, in one example, using any or all of these features, a prediction model may be trained and deployed to classify and/or score a phone number and/or a device identifier with respect to fraud activity. For instance, there may be two main objectives for fraud detection: to identify the phone numbers and/or device identifiers that are likely associated with fraud, and to detect and stop the fraud events themselves.

In one example, features that are used for fraud detection may include short-term features (e.g., one day features), such as outgoing call count, incoming call count, and/or incoming/outgoing call ratio. These features may be encoded into the respective nodes in the graph 210. For instance, if phone number PN 1 has 10 outgoing calls on a particular day, this may be recorded as node data for the node associated with PN 1. Features that are used for fraud detection may also include long-term features (e.g., features aggregated over 30-day or 60-day time periods, or the like), such as (for each relationship in the graph) the identities of the phone number-device identifier pair, the number of outgoing and/or incoming calls for which the phone number and device identifier are both implicated for either the calling or called party, the average call duration and/or overall time on calls, a number of messages, an average message size and/or total message data size/volume, etc. In one example, some or all of the features for fraud detection may be obtained from a graph embedding process, such as discussed above. In other words, the above features may comprise a vector or "embedding" derived from graph 210. Alternatively, or in addition, features may be extracted from graph 210 itself. For instance, features may be extracted from nodes and edges in the graph 210 via node traversal, or the like.

In one particular example, a feature that may be extracted from graph 210 may include a number of phone numbers associated with a device identifier. For instance, it is observed that there is a higher risk of fraud when a phone number is associated with more than one device identifier. In addition, this feature may also be extracted for nodes that are connected to a subject node (e.g., one-hop, two-hop, three-hop, or four-hop neighbors, etc.). In other words, these multiple features from neighbor nodes (and/or the intervening edges) may all be included in a feature vector that may be used as input(s) to a fraud prediction model.

FIG. 2 further illustrates a second example graph 220. In this case, graph 220 may be similar to graph 210 and may include at least some of the same phone numbers and device identifiers. However, graph 220 illustrates an edge between phone number PN 3 and phone number PN 6. Although PN 3 does not have a direction relationship with DI 2 as in the preceding example of graph 210, PN 3 may have a relationship with PN 6. For instance, this relationship may comprise a calling (and/or messaging relationship). In one example, the relationship may be predicated upon a threshold minimum number of calls and/or minutes of calling, a threshold minimum number of messages or total volume of message content, a bidirectional relationship in which both numbers have been used to initiate calls and/or messages with the other, a combination of any of the foregoing, and so forth. In one example, the relationship may comprise a "trusted" relationship. For instance, a relationship between two phone numbers may be designated as "trusted" when each party includes the other in a phone contact list, a social media contact list, or the like, when there is demonstrated bidirectional communications over a certain time period that exceeds a threshold volume of calls, duration of calls, number of messages, and/or volume of messages, and/or other similar features. In one example, a relationship between two phone numbers may be designated as "trusted" based on a weighted combination of any or all of these above factors. In one example, an account status of either or both parties may comprise a factor or factors in such a trust designation (e.g., a relationship is more likely to be correctly designated as "trusted" when both parties are on post-paid plans and have had identities verified in-person at a retail location to establish respective accounts), and so forth.

In this case, an anti-fraud platform of the present disclosure may be tasked with providing a fraud prediction/value with respect to PN 1, PN2, and/or DI 1, and may extract various features from the graph 220 in furtherance of this assignment (e.g. via a graph embedding process, node traversal, or otherwise). It should again be noted that in one example, features for more than one hop may be included in a vector/embedding or as additional features from the graph that are used for fraud scoring/categorization, such as, for telephone numbers having a direct relationship with a given/subject phone number, features associated with relationships of device identifiers with the other telephone numbers, and so forth. For instance, for a subject phone number PN 3 in graph 220, there may be a direct relationship with PN 6. In addition, features may be derived from two-hop relationships with PN 1, and PN 2, three-hop relationships with PN 4 and PN 5, and so forth. As just one example, additional features may include a mean/average neighbor outgoing call count and/or a maximum neighbor outgoing call count (e.g., for one-degree neighbors of outgoing calls from a subject telephone number). All of these features may be input to a prediction model, e.g., a gradient boosted machine (GBM) or the like, that is trained to categorize and/or score a phone number and/or a device identifier with respect to whether the phone number and/or device identifier is associated with fraud activity.

It should be noted that the graphs 210 and 220 illustrate a limited view of only a small portion of phone numbers and device identifiers that may be in use in a telecommunication network. However, insofar as fraud is still relatively rare compared to the entire subscriber base, and insofar as users infrequently change devices and may maintain phone numbers over a long period of time (e.g., 5 years, 10 years, or longer), a relationship graph may not have strong interconnections among cliques or other such groupings of mobile devices. Thus, while graph 220 may omit various calling relationships and/or trusted relationships among phone numbers and may therefore represent just a small portion of a larger graph, the graph 220 (and similarly graph 210) are illustrative of the principles of the present disclosure. In addition, it should be understood that in a time period of interest, such as 30 days, 60 days, etc., there may be many more communications between telephone numbers, especially when there is a trusted relationship, such as communications between close family members. In one example, the present disclosure may maintain a larger communication graph for numerous phone numbers of subscribers and/or non-subscribers of a telecommunication network, such as for all phone numbers sharing a particular area code, phone numbers sharing a same NPA-NXX, phone numbers associated with accounts in a particular state, or the like (where multiple graphs may be maintained for different groupings), or even for an entire subscriber base. For instance, in one example, graph 210 and/or graph 220 may represent a sub-graph of a much larger graph.

In addition, it should be noted that in one example, graph 210 and/or graph 210 may also include nodes representing billing accounts and links between phone numbers and such billing accounts, and between device identifiers and such billing accounts (not shown). Alternatively, or in addition, graph 210 and/or graph 220 may comprise a sub-graph of a larger graph that may include such nodes and edges. In one example, additional features may also be extracted from these nodes and/or edges (e.g., via a graph embedding process or otherwise) which may be included in a feature vector used as an input to a fraud detection model. For instance, in one example, a useful feature indicative of fraud is an average number of device identifiers for a given billing account (e.g., in a 14 day period, in a 30 day period, a one month period, or the like). For example, having more than one device identifier associated with a billing account indicates a slightly elevated risk for fraud. However, having zero device identifiers associated with a billing account (e.g., for the given recent time period of 14 days, 30 days, or the like) may be associated with a substantial increase in a likelihood of fraud. For instance, if CDRs are indicative of no usage of a device identifier on the telecommunication network within the last 30 days, this may be a significant risk factor for fraud, and which may therefore be used as at least one input factor to a fraud detection model when such a device identifier and/or billing account is with a relevant portion of the relationship graph (e.g., within several hops of a node being investigated).

It should also be noted that the initial data source(s) for the graph 210 and/or the graph 220 may comprise call detail records (CDRs) of a telecommunication network. In one example, CDRs may be collected and/or maintained in separate databases for voice calls and for other messages (MMS or SMS). For a particular telecommunication network, these data sources may include CDRs for calls originated and/or terminated with phone numbers of subscribers/customers of the telecommunication network. The daily call volume may exceed 2 billion calls and the daily message volume may exceed three billion messages per day for more than 200 million unique phone numbers. The total data size/volume of such records may exceed 120 GB in compressed parquet format. This means an average month of data may comprise approximately 3.6 TB. Simple aggregations in a data cluster (such as Apache Spark, or the like) may be possible via multiple joins. However, it could take days to perform such processing. Additionally, it may be desirable to join additional data sets for additional features for use in prediction models, such as account numbers to generate account level features, higher level relationships, e.g., account-to-account relationships, which can inform lower level relationships phone number-to-device identifier, phone number-to-phone number, and so forth.

The foregoing examples may be additionally expanded to include or may alternatively include additional features derived from graph 210 and/or graph 220. For instance, additional features may include a ratio of a number of calls to a number of answered calls, a number of calling minutes versus outgoing trusted calls ratio, a trusted edge count, a repeat call count, a number of unique phone numbers contacted, a median inter-call duration, a count of unique area codes called, a percentage of call to a predominant area code (the area code to which a given phone number places the most calls), a clique size (e.g., a number of strongly connected nodes on the graph to which a given node/telephone number belongs), and so forth. The features that are used for fraud detection may also include combined features derived from a graph (such as graph 220), such as: trusted outgoing call count, untrusted outgoing call count, and/or trusted/untrusted call (or messaging) ratio(s).

This structured call graph framework can be expanded for additional use cases and prediction models. In any case, examples of the present disclosure provide faster access to these multiple sources of data, e.g., call and message records indicative of relationships between phone numbers and device identifiers, between two phone numbers, between phone numbers and/or device identifier and billing accounts, and so forth. In one example, data maintenance may all be in graph form, or in a combination using pipelines and a distributed data platform (such as Apache Spark) to aggregate raw data before ingestion into the graph. However once in a relationship graph (which may also be referred to as a relationship graph database), additional derived features, such as embeddings/vectors, may be efficiently generated and used in real-time or near-real time (e.g., in hours, as opposed to days in the case of joins on tables, or other data structures).

Figure 3:
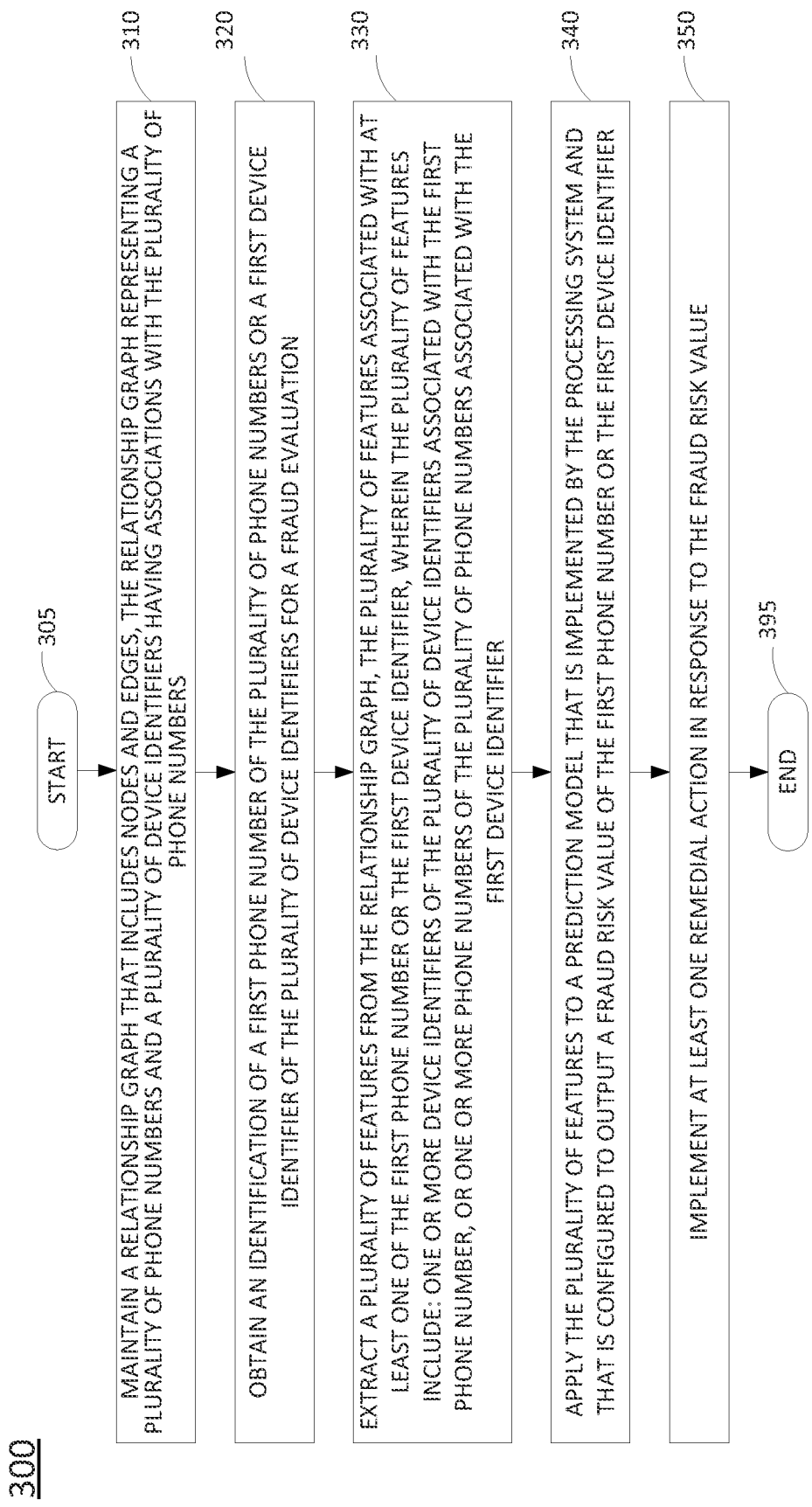
FIG. 3 illustrates a flowchart of an example method for applying a plurality of features extracted from a relationship graph representing a plurality of phone numbers and a plurality of device identifiers to a prediction model that is configured to output a fraud risk value of a first phone number or a first device identifier.

FIG. 3 illustrates an example flowchart of a method 300 for applying a plurality of features extracted from a relationship graph representing a plurality of phone numbers and a plurality of device identifiers to a prediction model that is configured to output a fraud risk value of a first phone number or a first device identifier. In one example, steps, functions, and/or operations of the method 300 may be performed by a device as illustrated in FIG. 1, e.g., one of servers 135. Alternatively, or in addition, the steps, functions and/or operations of the method 300 may be performed by a processing system collectively comprising a plurality of devices as illustrated in FIG. 1 such as one or more of server(s) 135, DB(s) 136, endpoint devices 111-113 and/or 121-123, devices 131-134, server(s) 155, and so forth. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system. The method 300 begins in step 305 and proceeds to step 310.

At step 310, the processing system maintains a relationship graph that includes nodes and edges, the relationship graph representing a plurality of phone numbers and a plurality of device identifiers having associations with the plurality of phone numbers. In one example, the maintaining of the relationship graph may include or be preceded by generating the relationship graph. In one example, the plurality of device identifiers may comprise international mobile equipment identity (IMEI) values, or the like. In addition, in one example, each of the plurality of phone numbers may be identified from a respective international mobile subscriber identity (IMSI) value. For instance, the phone number may comprise a mobile identification number (MIN) or mobile subscription identification number (MSIN) extracted from the IMSI. In addition, the IMSI may be associated with and stored on a SIM or SIM card. In one example, at least a first portion of the nodes of the relationship graph may represent the plurality of phone numbers and at least a second portion of the nodes of the relationship graph may represent the plurality of device identifiers. In addition, at least a first portion of the edges of the relationship graph may represent relationships between the plurality of phone numbers and the plurality of device identifiers.

In one example, at least a portion of the plurality of phone numbers may be phone numbers of subscribers of a telecommunication network. In addition, the relationships between the plurality of phone numbers and the plurality of device identifiers may be identified from call detail records (CDRs) of the telecommunication network (where the CDRs may relate to voice calls, text/SMS messaging or the like, and/or mobile data usage, for example). It should be noted that other phone numbers and/or device identifiers may be used by non-subscribers of the telecommunication network, but may still be included in the relationships graph insofar as these phone numbers and/or device identifiers may be included in CDRs involving communications with those who are subscribers of the telecommunication network.

In one example, at least a second portion of the edges in the relationship graph may represent relationships between pairs of the plurality of phone numbers (e.g., each such edge may be between a pair of nodes representing two phone numbers having a relationship). In this case, the relationships between the plurality of phone numbers may include calls between at least a first portion of the plurality of phone numbers, or trusted relationships between at least a second portion of the plurality of phone numbers. In one example, a phone number-to-phone number relationship may be predicated upon a threshold minimum number of calls and/or minutes of calling, a threshold minimum number of messages or total volume of message contents, a bidirectional relationship in which both numbers have been used to initiate calls and/or messages with the other, a combination of any of the foregoing, and so forth. In one example, the relationship may comprise a "trusted" relationship. For instance, a relationship between two phone numbers may be designated as "trusted" when each party includes the other in a phone contact list, a social media contact list, or the like, when there is demonstrated bidirectional communications over a certain time period that exceeds a threshold volume of calls, duration of calls, number of messages, and/or volume of messages, and so forth. In one example, call volume, message volume, etc. may be aggregated over 30 days, 60 days, 90 days, etc. In this regard, step 310 may also include identifying details of such communications from the CDRs, such as call duration, whether the call was answered/unanswered (which may or may not be indicated by the call duration), the caller and callee identities (e.g., the respective phone numbers), message size (e.g., in terms of data size/volume (e.g., a number of bytes, etc.)), and so forth, and appending this data to nodes and/or edges of the graph.

In one example, a trusted relationship comprises phone numbers being associated with a same billing account (or billing account number (BAN)). In addition, in one example, relationships between device identifiers being associated with the same billing account may also have associated edges included in the relationship graph. However, in another example, at least a third portion of the nodes of the relationship graph may represent a plurality of billing accounts, and at least a second portion of the edges of the relationship graph may represent relationships between at least one of: the plurality of phone numbers and the plurality of billing accounts, or the plurality of device identifiers and the plurality of billing accounts. In one example, the maintaining of the relationship graph at step 310 may include adding new nodes and/or edges when CDRs may indicate new relationships between phone number and device identifiers, phone number-to-phone number relationships, and so forth. Alternatively, or in addition, step 310 may include updating node or edge data such as incoming or outgoing call measures (e.g., number of calls, average call duration, etc., incoming or outgoing messages measures (e.g., number of messages, average message size, etc.), and so forth.

In one example, the relationship graph may be a large graph representing all phone numbers and/or device identifiers, or a large portion of phone numbers and/or device identifiers that are identified via CDRs of the telecommunication network. For instance, the graph may be seeded with all phone numbers of a certain NPA-NXX (numbering plan area-central office code/exchange code), etc. Alternatively, or in addition, the relationship graph may be a sub-graph of such a large graph. For instance, the graph (e.g., a sub-graph) may represent two or three hops from a subject node associated with a phone number or device identifier of interest.

At step 320, the processing system obtains an identification of a first phone number of the plurality of phone numbers or a first device identifier of the plurality of device identifiers for a fraud evaluation. For instance, a customer may visit a retail location of the telecommunication network or may initiate an online transaction to port-in a phone number and obtain a post-paid subscription with the telecommunication network. In response, the processing system may then be tasked with evaluating the phone number and/or device identifier for fraud risk. Similarly, in another example, an existing customer may seek to obtain a new mobile device with no money down to be paid off over a one or two year period on a post-paid subscription plan. In response, the processing system may then be tasked with evaluating the phone number associated with the account for fraud risk. It should be noted that there may be other triggers which cause the processing system to obtain the identification(s) for fraud evaluation, such as non-payment of a billing charge by a due date (including insufficient funds and/or declined credit card charges for automatic payments), a number of users blocking or reporting a phone number for spam, phishing, or other such activities, and so forth. In one example, the request may be received from a device at such a retail location, an online, e-commerce platform, or the like, such as one of the devices 131-134 in FIG. 1.

At step 330, the processing system extracts a plurality of features from the relationship graph, the plurality of features associated with at least one of the first phone number or the first device identifier, where the plurality of features may include: one or more device identifiers of the plurality of device identifiers associated with the first phone number, or one or more phone numbers of the plurality of phone numbers associated with the first device identifier. In one example, the plurality of features may include at least one of: a number of device identifiers associated with the first phone number, or a number of phone numbers associated with the first device identifier.

In one example, the extracting of step 330 may comprise generating at least one vector via a graph embedding process applied to the relationship graph. For instance, step 330 may be in accordance with a graph2vec algorithm or the like. In one example, the graph embedding process may be trained as part of a prediction model (e.g., a fraud detection/prediction model) or may be trained as a separate process from the prediction model. In one example, the graph embedding processing may comprise a guided graph embedding, e.g., where dimensionality of vector(s) and/or other hyperparameters is/are provided. Alternatively, dimensionality may be based upon selected loss criteria (e.g., allowable level/percentage of loss of information). In one example, the features and/or dimensionality of graph embedding may be optimized for the task of the prediction model (e.g., a prediction/classification task, such as fraud/not fraud, or fraud score (e.g., non-binary output)). The at least one vector may encode, extract, capture, or otherwise represent information about at least one of the nodes or at least one of the edges between two of the nodes. In another example, the plurality of features (e.g., at least one vector) may be extracted in a different manner, such as graph traversal starting from a node (or nodes) of interest and collecting data from nodes and edges that are two hops away, three hops away, etc.

In one example, the at least one vector may encode information from nodes and/or edges at least two-hops away from a node representing the first phone number or the first device identifier (such as a number of device identifiers associated with a phone number that is two hops away from the first phone number, a number of phone numbers associated with a device identifier that is two hops away from the first device identifier, etc.), and so on for three hops, four hops, etc. In one example, the at least one vector may encode information about the relationship graph overall.

In one example, the relationship graph may comprise a monopartite graph that is projected from a k-partite graph comprising additional nodes of at least one type other than a phone number type and a device identifier type. For instance, the k-partite graph may include sub-graphs comprising the relationship graph and an identity graph. For instance, an identity graph may include additional details about a phone number, such as an identity of an account owner, account-to-account relationships, mailing address information, and so forth. In such an example, the at least one vector may encode information about the k-partite graph (e.g., including additional information from at least the identity graph or any other sub-graphs of the k-partite graph).

In one example, at least one of the nodes in the relationship graph may be labeled with an indicator of a known fraud association. In such an example, the plurality of features may include the known fraud association (e.g., where the node so labeled may be one hop away from a node of interest, two hops away, three hops away, etc.). The plurality of features can also include the number of hops away (e.g., the closer a known fraud-associated node is to the node of interest, the more likely the node of interest is also fraud-associated). In an example in which the relationship graph includes nodes for billing accounts, the plurality of features may include a number of device identifiers associated with at least one of the plurality of billing accounts. For instance, having more than one device identifier associated with a billing account indicates a slightly elevated risk for fraud. However, having zero device identifiers associated with a billing account (e.g., for the given recent time period of 14 days, 30 days, or the like) may be associated with a substantial increase in a likelihood of fraud.

At step 340, the processing system applies the plurality of features to a prediction model (e.g., a fraud detection/prediction model) that is implemented by the processing system and that is configured to output a fraud risk value of the first phone number or the first device identifier. The prediction model may comprise a machine learning model (MLM) or other prediction models, such as gradient boosted machine (GBM), a regression-based prediction model, and so forth. The prediction model may be "trained" or configured in accordance with input data (e.g., training data) to perform a particular service, e.g., to detect/predict whether a phone number and/or device identifier is or is not associated with fraud activity, to classify a fraud risk level (e.g., high, medium, low risk), and/or to provide a fraud score/value indicative of a likelihood of fraud, and so forth. For instance, the prediction model may be configured to generate an output comprising a classification/prediction (e.g., a binary classification, a multi-class classification, a score/value indicative of a degree of belonging to a particular class, or one or more classes, and/or a confidence score indicative of the output classification, etc.). The training data may include labeled input data sets, e.g., previously generated vectors/embeddings that may then be labeled with respect to one or more target prediction/classification categories and used as training data for training the prediction model. In any case, step 340 may include obtaining the fraud risk value, which may comprise a binary output (e.g., fraud/no fraud or fraud likely/not likely), may have multiple categories (e.g., very high risk, high risk, neutral, low risk, very low risk), may be an output on a continuous scale (e.g., zero to 100, with zero being low risk and 100 being high risk, etc.), or the like.

At step 350, the processing system implements at least one remedial action in response to the fraud risk value. The remedial action may include transmitting a notification to one or more network personnel (e.g., endpoint devices associated with network personnel that may be responsible for allowing or denying an in-person transaction at a retail location (such as obtaining a new endpoint device), network personnel who may be authorized to block or suspend telephone numbers, or the like). In one example, the remedial action may include locking or blocking access to a subscriber account, sending a code for two-factor authentication, sending a text message or email alerting an account owner of suspicious activity indicative of spoofing, account takeover or compromise, or the like, imposing increasing inter-call time gaps, and so on. In one example, the remedial action may comprise adding a label to the relationship graph indicating the output of the prediction model (e.g., a fraud score/value, a label of "suspected fraud", or the like). Notably, these labels may be used as additional input factors for various prediction models with respect to other phone numbers or other device identifiers represented in the same or a different relationship graph. For instance, for a given phone number, a prediction model may be more likely to classify the phone number as being a fraud-associated when the phone number has communications with at least one other phone number that is labeled as a fraud-associated or that is a one hop connection to a labeled likely fraud-associated (and similarly with regard to other designations for various types of monitored network activities, e.g., robocalling, phishing, smishing, malicious/threat activities, or other activities that are not necessarily harmful to other users but which may exceed the terms of use according to a subscriber agreement, etc.).

Following step 350, the method 300 ends in step 395.

It should be noted that method 300 may be expanded to include additional steps, or may be modified to replace steps with different steps, to combine steps, to omit steps, to perform steps in a different order, and so forth. For instance, in one example, the processing system may repeat one or more steps of the method 300, such as steps 310-350, or steps 320-350, for additional phone number and/or device identifiers, and so forth. In one example, the method 300 may include training the prediction model in accordance with a training data set (e.g., groups/sets of input factors for phone numbers or calls for which labels have been applied). In one example, the method 300 may include retraining the prediction model, e.g., when a detected accuracy falls below a threshold accuracy, when the detected accuracy declines a certain percentage below an expected accuracy when the prediction model was deployed, etc. In one example, the method 300 may be expanded to include update/maintaining the relationship graph to include a label for a node representing the first phone number and/or a node representing the second phone number indicative of the fraud value that is determined at step 340. Alternatively, or in addition the remedial action of step 350 may include such an updating of the graph. In one example, the method 300 may include generating the relationship graph, e.g., prior to step 310. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not specifically specified, one or more steps, functions, or operations of the method 300 may include a storing, displaying, and/or outputting step as required for a particular application. In other words, any data, records, fields, and/or intermediate results discussed in the method 300 can be stored, displayed and/or outputted either on the device(s) executing the method 300, or to another device or devices, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

Figure 4:
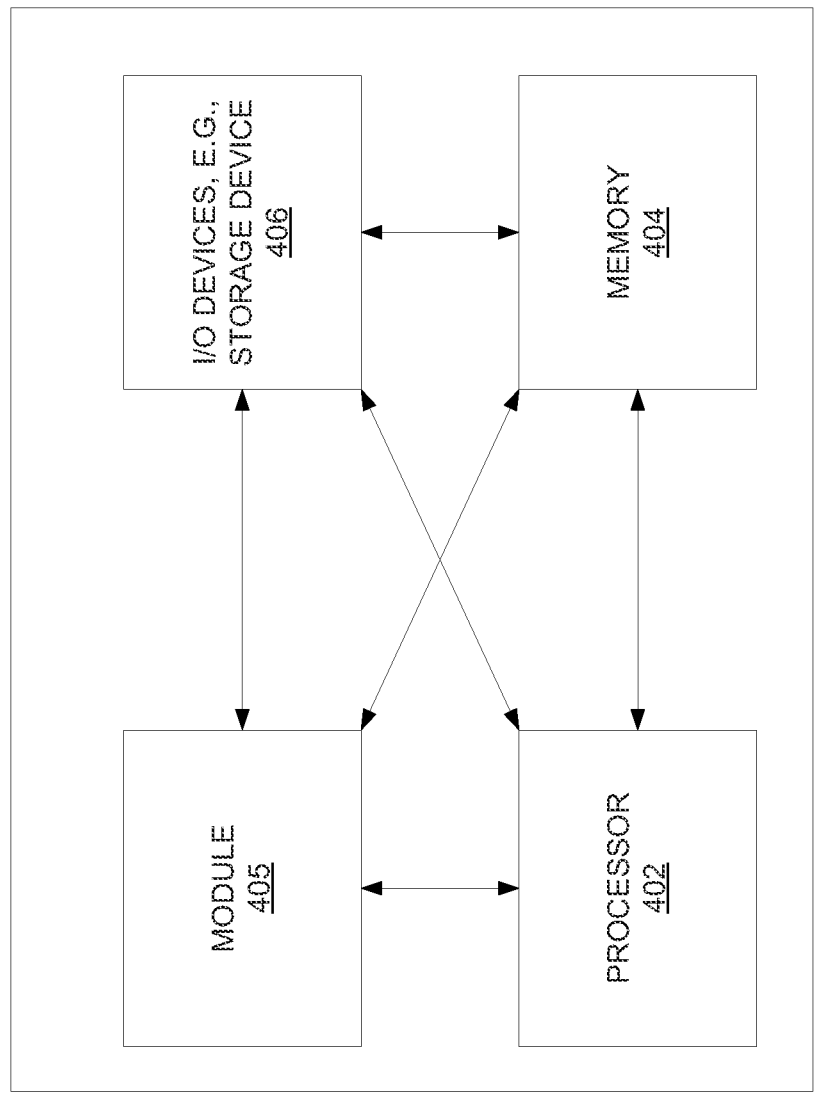
FIG. 4 illustrates a high-level block diagram of a computing device specially programmed to perform the functions described herein.

FIG. 4 depicts a high-level block diagram of a computing system 400 (e.g., a computing device, or processing system) specifically programmed to perform the functions described herein. For example, any one or more components or devices illustrated in FIG. 1, or described in connection with the examples of FIGS. 2 and 3 may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where hardware processor element may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for applying a plurality of features extracted from a relationship graph representing a plurality of phone numbers and a plurality of device identifiers to a prediction model that is configured to output a fraud risk value of a first phone number or a first device identifier, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, it should be noted that the computing device may employ a plurality of hardware processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for applying a plurality of features extracted from a relationship graph representing a plurality of phone numbers and a plurality of device identifiers to a prediction model that is configured to output a fraud risk value of a first phone number or a first device identifier (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for applying a plurality of features extracted from a relationship graph representing a plurality of phone numbers and a plurality of device identifiers to a prediction model that is configured to output a fraud risk value of a first phone number or a first device identifier (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   maintaining, by a processing system including at least one processor, a relationship graph that includes nodes and edges, the relationship graph representing a plurality of phone numbers and a plurality of device identifiers having associations with the plurality of phone numbers, wherein at least a first portion of the nodes of the relationship graph represents the plurality of phone numbers and at least a second portion of the nodes of the relationship graph represents the plurality of device identifiers, and wherein at least a first portion of the edges of the relationship graph represents relationships between the plurality of phone numbers and the plurality of device identifiers;

obtaining, by the processing system, an identification of a first phone number of the plurality of phone numbers or a first device identifier of the plurality of device identifiers for a fraud evaluation;

extracting, by the processing system, a plurality of features from the relationship graph, the plurality of features associated with at least one of: the first phone number or the first device identifier, wherein the plurality of features includes: one or more device identifiers of the plurality of device identifiers associated with the first phone number, or one or more phone numbers of the plurality of phone numbers associated with the first device identifier;

applying, by the processing system, the plurality of features to a prediction model that is implemented by the processing system and that is configured to output a fraud risk value of the first phone number or the first device identifier; and implementing, by the processing system, at least one remedial action in response to the fraud risk value.

2. The method of claim 1, wherein the plurality of device identifiers comprises international mobile equipment identity values.

3. The method of claim 1, wherein each of the plurality of phone numbers is identified from an international mobile subscriber identity value.

4. The method of claim 1, wherein at least a portion of the plurality of phone numbers comprises phone numbers of subscribers of a telecommunication network, wherein the relationships between the plurality of phone numbers and the plurality of device identifiers are identified from call detail records of the telecommunication network.

5. The method of claim 1, wherein at least a second portion of the edges represents relationships between the plurality of phone numbers.

6. The method of claim 5, wherein the relationships between the plurality of phone numbers include at least one of:
calls between at least a first portion of the plurality of phone numbers; or
trusted relationships between at least a second portion of the plurality of phone numbers.

7. The method of claim 1, wherein the plurality of features includes at least one of:
a number of device identifiers associated with the first phone number; or
a number of phone numbers associated with the first device identifier.

8. The method of claim 1, wherein at least one of the nodes is labeled with an indicator of a known fraud association, wherein the plurality of features includes the known fraud association.

9. The method of claim 1, wherein at least a third portion of the nodes of the relationship graph represents a plurality of billing accounts, and wherein at least a second portion of the edges of the relationship graph represents relationships between at least one of: the plurality of phone numbers and the plurality of billing accounts, or the plurality of device identifiers and the plurality of billing accounts.

10. The method of claim 9, wherein the plurality of features includes a number of device identifiers associated with at least one of the plurality of billing accounts.

11. The method of claim 1, wherein the extracting of the plurality of features from the relationship graph comprises:
generating at least one vector via a graph embedding process applied to the relationship graph.

12. The method of claim 11, wherein the applying of the plurality of features to the prediction model comprises applying the at least one vector as at least one input to the prediction model.

13. The method of claim 11, wherein the graph embedding process is trained as part of the prediction model or is trained as a separate process from the prediction model.

14. The method of claim 11, wherein the at least one vector encodes information about at least one of the nodes or at least one of the edges between two of the nodes.

15. The method of claim 14, wherein the at least one vector encodes information from at least two-hops away from a node representing the first phone number or the first device identifier.

16. The method of claim 1, wherein the prediction model comprises a fraud detection model.

17. The method of claim 1, wherein the prediction model comprises a machine learning model.

18. A non-transitory computer-readable medium storing instructions which, when executed by a processing system including at least one processor, cause the processing system to perform operations, the operations comprising:
maintaining a relationship graph that includes nodes and edges, the relationship graph representing a plurality of phone numbers and a plurality of device identifiers having associations with the plurality of phone numbers,
wherein at least a first portion of the nodes of the relationship graph represents the plurality of phone numbers and at least a second portion of the nodes of the relationship graph represents the plurality of device identifiers, and wherein at least a first portion of the edges of the relationship graph represents relationships between the plurality of phone numbers and the plurality of device identifiers;
obtaining an identification of a first phone number of the plurality of phone numbers or a first device identifier of the plurality of device identifiers for a fraud evaluation;
extracting a plurality of features from the relationship graph, the plurality of features associated with at least one of: the first phone number or the first device identifier, wherein the plurality of features includes: one or more device identifiers of the plurality of device identifiers associated with the first phone number, or one or more phone numbers of the plurality of phone numbers associated with the first device identifier;
applying the plurality of features to a prediction model that is implemented by the processing system and that is configured to output a fraud risk value of the first phone number or the first device identifier; and
implementing at least one remedial action in response to the fraud risk value.

19. An apparatus comprising:
a processing system including at least one processor; and
a non-transitory computer-readable medium storing instructions which, when executed by the processing system, cause the processing system to perform operations, the operations comprising:

maintaining a relationship graph that includes nodes and edges, the relationship graph representing a plurality of phone numbers and a plurality of device identifiers having associations with the plurality of phone numbers, wherein at least a first portion of the nodes of the relationship graph represents the plurality of phone numbers and at least a second portion of the nodes of the relationship graph represents the plurality of device identifiers, and wherein at least a first portion of the edges of the relationship graph represents relationships between the plurality of phone numbers and the plurality of device identifiers;

obtaining an identification of a first phone number of the plurality of phone numbers or a first device identifier of the plurality of device identifiers for a fraud evaluation;

extracting a plurality of features from the relationship graph, the plurality of features associated with at least one of: the first phone number or the first device identifier, wherein the plurality of features includes: one or more device identifiers of the plurality of device identifiers associated with the first phone number, or one or more phone numbers of the plurality of phone numbers associated with the first device identifier;

applying the plurality of features to a prediction model that is implemented by the processing system and that is configured to output a fraud risk value of the first phone number or the first device identifier; and implementing at least one remedial action in response to the fraud risk value.

20. The apparatus of claim 19, wherein the plurality of device identifiers comprises international mobile equipment identity values.

* * * * *